(12) United States Patent
Shaw et al.

(10) Patent No.: US 8,520,219 B2
(45) Date of Patent: Aug. 27, 2013

(54) NON-CONTACT SENSOR HAVING IMPROVED LASER SPOT

(75) Inventors: William E. Shaw, Milan, MI (US); David Crowther, Bloomfield Hills, MI (US)

(73) Assignee: Perceptron, Inc., Plymouth, MI (US)

( * ) Notice: Subject to any disclaimer, the term of this patent is extended or adjusted under 35 U.S.C. 154(b) by 0 days.

(21) Appl. No.: 13/329,871

(22) Filed: Dec. 19, 2011

(65) Prior Publication Data
US 2013/0155418 A1 Jun. 20, 2013

(51) Int. Cl.
*G01B 11/30* (2006.01)

(52) U.S. Cl.
USPC .......................................... 356/612; 356/601

(58) Field of Classification Search
USPC ................. 356/601–602, 606–609, 611–617, 356/619–640; 353/30, 33–34, 37, 98–99, 353/122; 348/195–205
See application file for complete search history.

(56) References Cited

U.S. PATENT DOCUMENTS

| | | | |
|---|---|---|---|
| 5,668,631 A * | 9/1997 | Norita et al. | 356/608 |
| 5,748,505 A | 5/1998 | Greer | |
| 6,473,167 B1 | 10/2002 | Odell | |
| 6,624,899 B1 | 9/2003 | Clark | |
| 6,733,135 B2 | 5/2004 | Dho | |
| 6,910,776 B2 | 6/2005 | Dho et al. | |
| 7,029,126 B2 | 4/2006 | Tang | |
| 7,232,071 B2 | 6/2007 | Lewis et al. | |
| 7,252,394 B1 | 8/2007 | Fu | |
| 7,277,173 B1 | 10/2007 | Bock et al. | |
| 7,346,234 B2 | 3/2008 | Davis et al. | |
| 7,961,316 B2 * | 6/2011 | Hsieh et al. | 356/326 |

(Continued)

FOREIGN PATENT DOCUMENTS

| EP | 1091186 | 4/2001 |
|---|---|---|
| JP | 2002236264 | 8/2002 |

(Continued)

*Primary Examiner* — Tri T Ton
(74) *Attorney, Agent, or Firm* — Harness, Dickey & Pierce, P.L.C.

(57) ABSTRACT

A non-contact sensing system acquiring three-dimensional information includes a laser light source and fiber generating a Gaussian optical beam. A movable mirror is angularly adjusted to scan the beam to an area of illumination. A lens package between the light source and the movable mirror focuses the optical beam to under-fill a movable mirror optical surface and control an optical beam scanned volume. The optical beam reflected by the movable mirror is redirected using a fold mirror orthogonal to an optical beam orientation. The optical beam is maintained Gaussian by the mirrors and lenses. An imaging device having a field of view intersecting the area of illumination receives optical beam image data reflected from the area of illumination. A control module communicating with the imaging device receives an object location in the imaging device field of view from the image data and reports object location data to a coordinate system.

28 Claims, 6 Drawing Sheets

(56) References Cited

U.S. PATENT DOCUMENTS

| | | |
|---|---|---|
| 2002/0105653 A1 | 8/2002 | Pezeshki |
| 2002/0180988 A1 | 12/2002 | Johnston et al. |
| 2003/0011751 A1* | 1/2003 | Sakata et al. .................... 353/30 |
| 2005/0052635 A1 | 3/2005 | Xie et al. |
| 2005/0146764 A1 | 7/2005 | Deng et al. |
| 2006/0139714 A1 | 6/2006 | Gruhlke et al. |
| 2006/0158662 A1 | 7/2006 | Schelinski et al. |
| 2006/0291063 A1 | 12/2006 | Takemoto |
| 2007/0057211 A1 | 3/2007 | Bahlman et al. |
| 2007/0070046 A1 | 3/2007 | Sheynblat et al. |
| 2008/0037090 A1 | 2/2008 | Miller et al. |
| 2008/0049101 A1 | 2/2008 | Yamazaki |
| 2008/0073484 A1 | 3/2008 | Kane |

FOREIGN PATENT DOCUMENTS

| | | |
|---|---|---|
| JP | 2004085596 | 3/2004 |
| JP | 2006189573 | 7/2006 |
| JP | 2006343397 | 12/2006 |
| JP | 2008-256465 | 10/2008 |
| WO | WO995712 | 11/1999 |
| WO | WO 2006-076731 | 7/2006 |

* cited by examiner

NON-CONTACT SENSOR HAVING IMPROVED LASER SPOT

FIELD

The present disclosure relates to laser projection systems and a method for sensing structured light contour using micro electro-mechanical system (MEMS) or other movable mirrors and multiple lens or mirror components to coordinate measurements of an object within a scanned volume.

BACKGROUND

Systems which determine surface dimensions or a contour of an object surface by measuring a reflected light beam compared to an initial or projected light beam using visible or infra-red light are known. Such systems may include one or more mirrors to direct the projected light and to reflect the incident light back to a receiving device.

The space envelope required to combine the necessary components into a system such as a sensor head can often be too large to provide a desired beam size without inducing beam focus problems and therefore faulty surface mapping. Reducing the space envelope for the optical components becomes problematic due to the difficulty of controlling beam width while minimizing distortion. The ability to focus the optical components can also be problematic where space limitations do not permit tilting of the mirrors to a desired angular degree.

This section provides background information related to the present disclosure which is not necessarily prior art.

SUMMARY

According to several aspects, a non-contact sensing system for acquiring three-dimensional information includes a laser light source generating a laser beam. A fiber receives the laser beam and creates a Gaussian distributed optical beam. A movable mirror receives the optical beam. The movable mirror is angularly adjusted to scan the optical beam to an area of illumination. A lens package positioned between the laser light source and the movable mirror receives the optical beam from the fiber and sizes the optical beam to under-fill an optical surface of the movable mirror. An imaging device receives image data of the area of illumination from the optical beam returned from the area of illumination. A control module in data communication with the imaging device operates to determine location data of an object from the image data and report the location data in a coordinate system.

According to further aspects, a non-contact sensing system for acquiring three-dimensional information includes a laser light source generating an elliptical-shaped laser beam. An output fiber receives the laser beam and creates a Gaussian distributed optical beam. A movable mirror receives the optical beam and is angularly adjusted to scan the optical beam to an area of illumination. A lens package positioned between the laser light source and the movable mirror receives the optical beam from the output fiber and focuses the optical beam to under-fill an optical surface of the movable mirror. A fixed fold mirror receives the optical beam from the movable mirror. The fold mirror and the movable mirror together redirect the optical beam orthogonally with respect to an orientation of the optical beam generated by the laser light source. An imaging device has a field of view intersecting with the area of illumination thereby receiving image data of the optical beam reflected from the area of illumination. A control module is in data communication with the imaging device operating to determine a location of an object in the field of view of the imaging device from the image data and report location data of the object to a coordinate system.

According to other aspects, a non-contact sensing system for acquiring three-dimensional information includes a diode defining a laser light source operating to emit a laser beam. An output fiber receiving the laser beam creates a Gaussian distributed optical beam. A lens package receives and focuses the optical beam. The lens package includes in sequence: a collimating lens; and first and second lenses defining a beam reducer. A movable mirror receives the optical beam from the lens package collimated by the collimating lens and has a diameter reduced by the first and second lenses to under-fill (present an area less than) a surface area of the movable mirror. A fixed fold mirror receives the optical beam from the movable mirror. The movable mirror and the fold mirror operate to scan the optical beam to an area of illumination. An imaging device has a field of view intersecting with the area of illumination thereby receiving image data of the optical beam reflected from the area of illumination. A control module in data communication with the imaging device receives a location of an object in the field of view of the imaging device from the image data and reports location data of the object to a coordinate system.

According to still further aspects, a method is provided for acquiring three-dimensional information using a non-contact sensing system, the non-contact sensing system including a fiber coupled laser, a lens package including a collimating lens and first and second lenses defining a beam reducer, a movable mirror, a fold mirror, an imaging device and a control module. The method includes: generating a Gaussian distributed optical beam using the fiber coupled laser; receiving and focusing the optical beam using the lens package by changing a spacing between the first and second lenses thereby reducing a diameter of the optical beam to correspond to a surface area of the movable mirror; directing the optical beam using the movable mirror to the fold mirror; angularly adjusting the movable mirror to reflect the optical beam from the fold mirror to scan the optical beam to an area of illumination; operating the imaging device to receive image data of the optical beam reflected from the area of illumination; and determining a location of an object in the field of view of the imaging device from the image data using the control module.

This section provides a general summary of the disclosure, and is not a comprehensive disclosure of its full scope or all of its features.

Further areas of applicability will become apparent from the description provided herein. The description and specific examples in this summary are intended for purposes of illustration only and are not intended to limit the scope of the present disclosure.

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
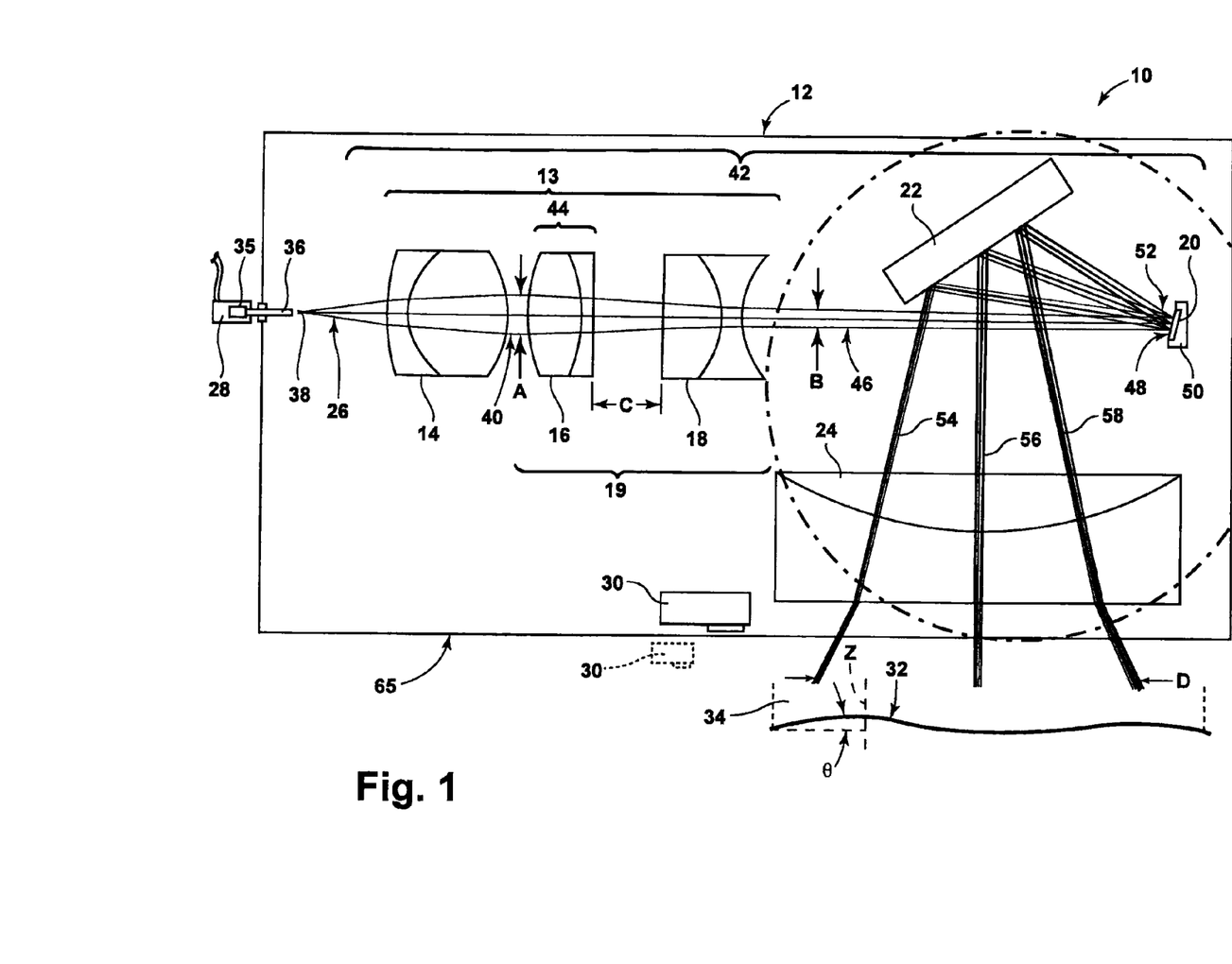
FIG. 1 is a diagram of a non-contact sensor of the present disclosure.

Referring to FIG. 1, a sensor system 10 for acquiring three-dimensional contour information includes a sensor head 12 containing five optical components. These include a lens package 13 having a collimating lens 14 and first and second beam reducer lenses 16, 18 which together define a beam reducer 19. The optical components further include a precision movable mirror 20 such as a micro electro-mechanical system (MEMS) mirror, an electrostatic drive mirror, a piezoelectrically driven mirror, or an angularly trainable mirror. Finally, the optical components include a fixed-in-position fold mirror 22 such as a fold mirror, and a diverger lens 24. These five optical components condition and scan a Gaussian distributed optical beam 26 generated by and received from a light source 28 such as a fiber-coupled laser that functions in conjunction with an imaging device 30 to obtain three-dimensional coordinate measurements of an object 32 within a specified area of illumination defining a scanned area 34. The total surface area and any objects or irregularities of scanned area 34 defines an optical beam scanned volume. According to several embodiments imaging device 30 is a CCD camera. The sensor system 10 acts as a "non-contact" system in that the sensor head 12 remains remote from and therefore does not directly physically contact the object 32 in order to acquire the three-dimensional coordinate measurements. The precision "movable" mirror 20 can be moved such as by angular rotation or displacement such that an orientation of the reflective surface of precision movable mirror 20 can be adjusted and/or trained.

The collimating lens 14 removes divergence inherent in optical beam 26 generated by the fiber-coupled laser light source 28. The fiber-coupled laser light source 28 includes a diode 35 creating an elliptical-shaped laser beam. Diode 35 is optically coupled to an optical fiber such as an output fiber 36 which scrambles the energy of the elliptical-shaped laser beam and delivers a circular Gaussian light or spot defining Gaussian distributed optical beam 26 which is thereafter directed and controlled by the optical components of sensor head 12. Output fiber 36 emits optical beam 26 at a focus 38 of the collimating lens 14 which collimates optical beam 26 to be emitted as a collimated beam 40 having a diameter "A" of approximately 1.0 to 1.5 millimeters. The collimated beam 40 is thereafter refocused by beam reducer 19 to constrain the beam size and maintain collimated beam 40 in a collimated condition to entirely fit on the surface of precision movable mirror 20 while also being of a controlled size within the entire scanned volume defined by the intersection of the imaging device 30 field of view and the scanned area 34 of the optical beam.

The present disclosure contemplates multiple different sized sensor heads 12 which can vary depending on space envelope available and the beam standoff distance to the measurement scanned area 34. This criterion requires using lenses of short focal length and therefore wide field-of-view. In order to retain the components of sensor head 12 within the packaging constraints of the multiple different sized sensor heads 12, an overall optical train 42 is maintained as small as possible. Optical train 42 includes collimating lens 14, first and second beam reducer lenses 16, 18, precision movable mirror 20 and fold mirror 22. To maintain the focus of optical beam 26, an achromatic doublet 44 of two lenses fixedly joined is used to create individual lenses of the beam reducer 19. According to several embodiments an achromatic doublet is used for first beam reducer lens 16. According to several embodiments, second beam reducer lens 18 is a singlet lens. The use of achromatic doublets minimizes spherical aberration that can create optical defects causing increased beam diameter and degrade Gaussian characteristics of the optical beam 26 at distance.

The first and second beam reducer lenses 16, 18 receive the collimated beam 40 from the collimating lens 14 and size the collimated beam 40 to a reduced diameter output beam 46 having a reduced diameter "B" which is smaller than diameter "A" so it will under-fill an optical surface 48 of precision movable mirror 20. It is desirable to keep the reduced diameter "B" of reduced diameter output beam 46 smaller than a surface area "Z" of precision movable mirror 20 to under fill (present an area smaller than) surface area "Z" of precision movable mirror 20 and thereby minimize scattered light from surrounding movable support structure 50. Scattered light from support structure 50 can potentially result in false or erroneous sensor measurements. According to several embodiments, a maximum value of reduced diameter "B" at precision movable mirror 20 is 0.5 mm.

As with the collimating lens 14, reduced diameter output beam 46 exits the first and second beam reducer lenses 16, 18 in a collimated or near-collimated condition to minimize a rate at which the reduced diameter "B" of reduced diameter output beam 46 can subsequently grow with distance away from second beam reducer lens 18. A small amount of convergence in reduced diameter output beam 46 after the first and second beam reducer lenses 16, 18 is also desirable to further minimize diametrical growth of reduced diameter output beam 46 with distance. Changes to a spacing "C" between first and second beam reducer lenses 16, 18 are made by manual adjustment during assembly of sensor head 12 and then spacing "C" is fixed. Adjustment of spacing "C" during assembly allows the location of a beam waist 52 to be adjusted and then fixed during assembly, to optimize the performance of sensor system 10. Beam waist 52 defines a narrowest diameter of reduced diameter output beam 46 corresponding to an area smaller than a surface area of optical surface 48. As noted above, according to several embodiments a diameter of beam waist 52 is $\leq 0.5$ mm. Controlling the diameter at beam waist 52 to $\leq 0.5$ mm provides an average beam spot size "D" ranging from approximately 1.0 mm to 1.5 mm to be achieved anywhere over the given scanned area 34.

Together with the collimating lens 14, the packaging constraints of sensor heads 12 include the use of short focal-length lenses. As previously noted, achromatic doublets can be used to minimize spherical aberration and maintain the beam characteristics necessary for accurate measurements. In sensor systems 10 where packaging is not a primary design driver, longer focal length singlet lenses (not shown) can also be substituted for achromatic doublet lenses 44 in the first beam reducer lens 16.

Referring to FIG. 2 and again to FIG. 1, precision movable mirror 20 provides two orthogonal angular scan axes "E", "F" (scan axis "F" is directed toward and away from the viewer as seen in FIG. 2) that sweep the reduced diameter output beam 46 through the sensor measurement scanned area 34. The "precision" movement of precision movable mirror 20 is defined by the capability to control mirror movement using a defined scanning frequency over a defined range of rotation or movement. According to several embodiments, a movable mirror scanning frequency of approximately 1 to 3 kHz over an angular range of approximately 6 degrees is used. Operationally, precision movable mirror 20 is treated as a near-flat mirror that pivots about at least one axis of its optical surface 48, however, due to limitations in the manufacturing techniques of precision movable mirror 20, small amounts of optical power can be induced in the optical surface 48 during fabrication. The focus adjustment provided by the adjustment of spacing "C" between the first and second beam reducer lenses 16, 18 is also used when necessary to negate this small amount of power that might otherwise degrade beam size and quality over the measurement scanned area 34. The precision movable mirror 20, when provided as a MEMS mirror, preferably employs electrostatic actuation to position the mirror and thereby direct the optical beam 26 to the object 32. An exemplary precision movable mirror 20 is a two-axis scanning micro-mirror device commercially available from Mirrorcle Technologies, Inc. in Richmond, Calif. As noted herein multiple types of movable mirror devices are also contemplated by this disclosure.

Figure 2:
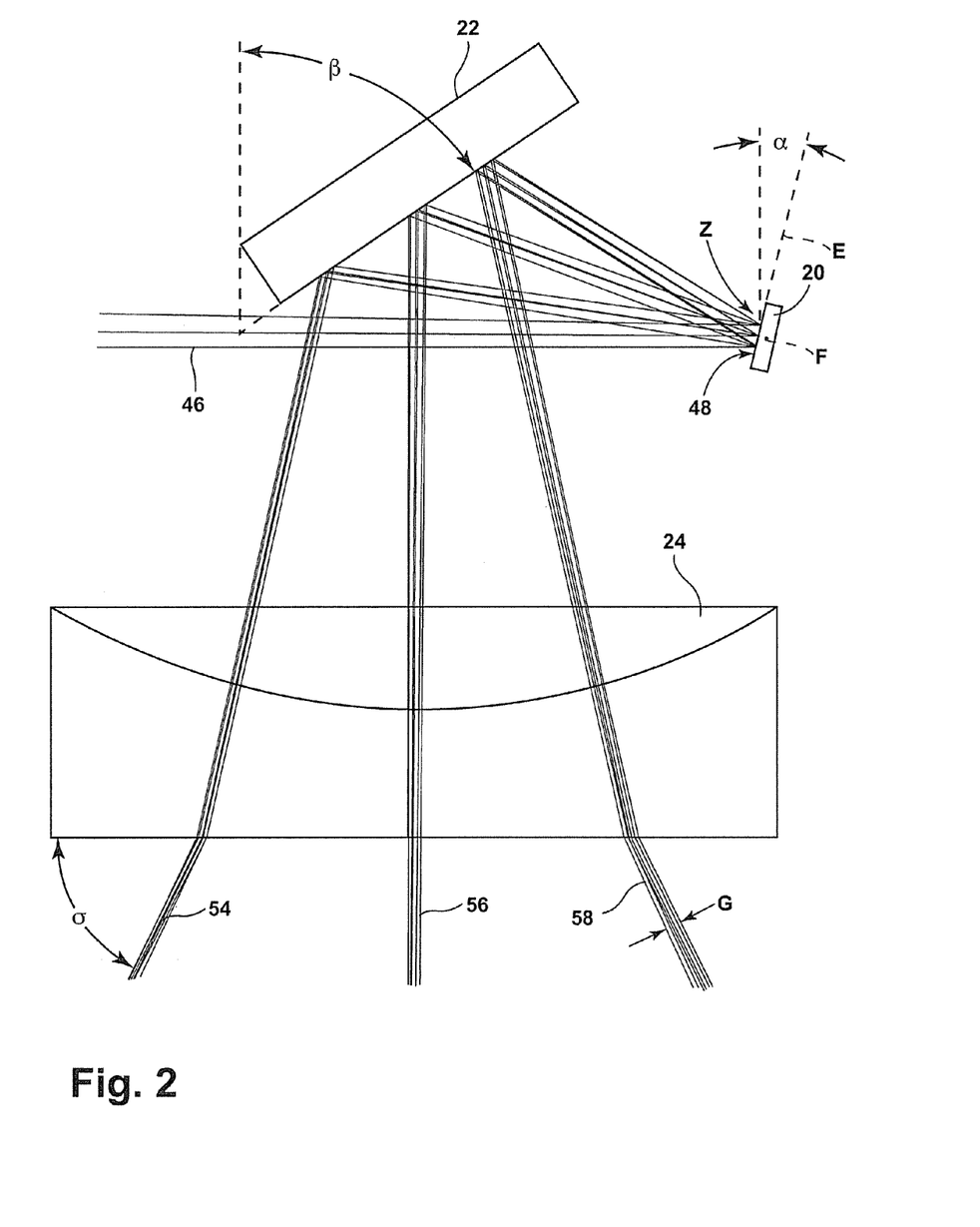
FIG. 2 is a diagram of area 2 of FIG. 1.

With continuing reference to FIGS. 1 and 2, the fold mirror 22, together with the precision movable mirror 20, folds or orients outgoing beams 54, 56, 58 through a right angle with respect to reduced diameter output beam 46. This orthogonal folding of the outgoing beams provides an additional benefit of reducing an overall optical package length by positioning fold mirror 22 back toward second beam reducer lens 18. Fold mirror 22 not only redirects reduced diameter output beam 46 reflected from precision movable mirror 20, but also helps to maintain a round shape of the dot and Gaussian energy distribution of optical beam 26. The use of fold mirror 22 also allows the precision movable mirror 20 to be initially tilted at a minimally shallow (approximately 5 to 20 degrees) tilt angle alpha ($\alpha$) with respect to reduced diameter output beam 46, so the reduced diameter output beam 46 is not reflected back upon itself. Tipping the precision movable mirror 20 at a larger angle than tilt angle alpha ($\alpha$) (i.e., greater than 20°), could increase the space envelope required for optical train 42, and could introduce scan distortion into the measurement data. This distortion is non-linear and would need to be mapped out at the system level and removed from every measurement. The optical beam 26 is maintained Gaussian throughout the optical train 42 of sensor system 10 by the mirrors and lenses.

By minimizing tilt angle $\alpha$ of precision movable mirror 20 and using a tilt angle beta ($\beta$) of the fold mirror 22 for a majority of the right-angle fold (tilt angle $\beta$=45°−tilt angle alpha $\alpha$), a compact optical package is realized for optical train 42, while minimizing scan distortion. According to one embodiment, exemplary dimensions for sensor system 10 include a length of optical train 42 of approximately 62 mm, a surface area of fold mirror 22 of approximately 100 mm (10 mm×10 mm), and a spacing from reduced diameter output beam 46 to the output of diverger lens 24 of approximately 23 mm. These dimensions are exemplary and can be modified within the scope of this disclosure. This approach improves system accuracy and reduces post-measurement data processing time compared to use of a tilt angle greater than tilt angle $\alpha$.

The diverger lens 24 is provided for applications when it is necessary to increase a scan angle delta ($\delta$) of the outgoing beams 54, 58 when the angular travel of the precision movable mirror 20 alone cannot provide the desired scan measurement of scanned area 34. For applications having maximum standoff distance between the sensor head 12 and object 32 (approximately 1200 to 1600 mm) diverger lens 24 can be omitted. Diverger lens 24 is manually adjustable during its installation to permit varying the scan angle delta $\delta$, and is thereafter fixed in position. Because it is sensitive to temperature change, diverger lens 24 can induce some additional unwanted growth (defocus) in the beam reduced diameter "B" with distance. The small adjustments to spacing "C" as previously described herein are therefore made by moving first and/or second beam reducer lenses 16, 18 to mitigate this defocus effect. A diameter "G" of outgoing beams 54, 56, 58 as precision movable mirror 20 is scanned over its operating frequency is sufficiently small at diverger lens 24 that spherical aberration is not considered a problem, therefore an achromatic doublet lens is not required at this location.

Referring to FIG. 3 and again to FIGS. 1 and 2, non-contact sensor system 10 for acquiring three-dimensional contour information of the present disclosure includes a light source subsystem 60 having precision movable mirror 20 (represented for example as a MEMS mirror) and light source 28 which is operable to project a point of light, and includes the imaging device 30 operating to scan the point of light in the area of illumination of scanned area 34. In one exemplary embodiment, light source subsystem 60 is a fiber coupled laser (defined as a laser outputting a laser beam with the laser beam being coupled to a fiber for transmission of the laser beam) directing a beam of light to the precision movable mirror 20 through the collimating lens 14, and the beam reducer 19, and further includes fold mirror 22.

Figure 3:
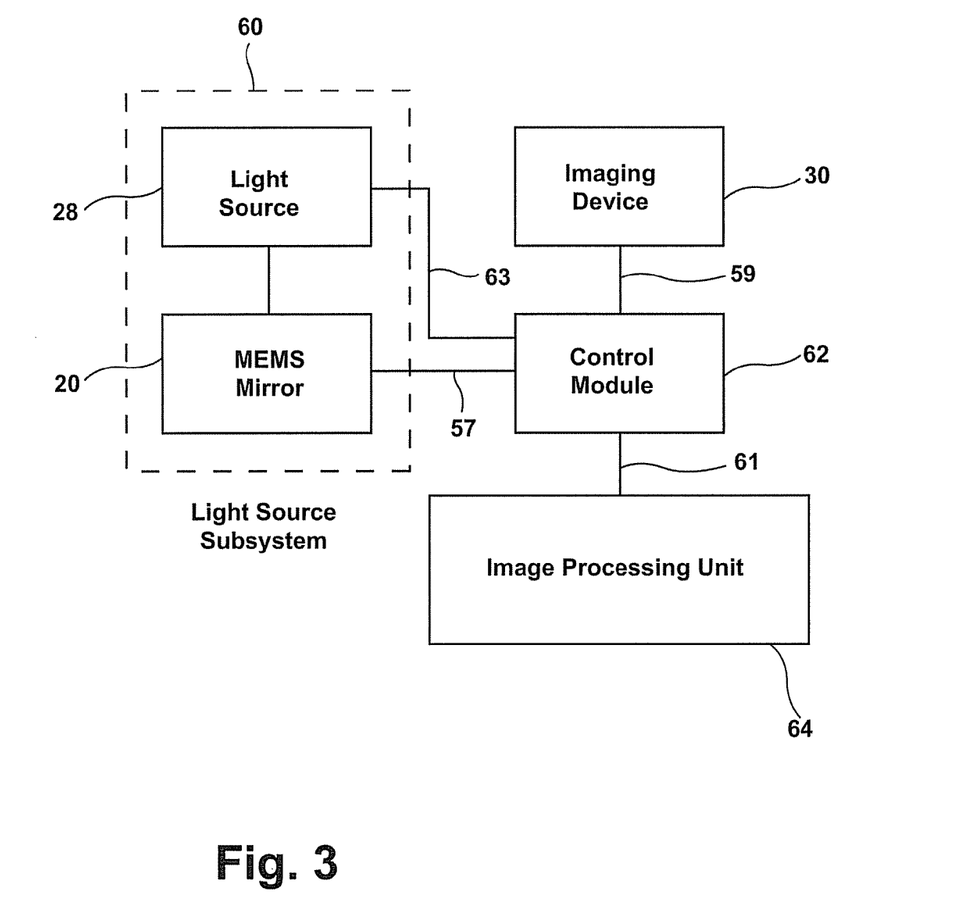
FIG. 3 is a block diagram of a non-contact sensor system with a control module and imaging processing unit further shown.

With continuing reference to FIG. 3, control of the sweep angle and sweep frequency of precision movable mirror 20 is provided by a control module 62 via a communication path 57. The image data received by imaging device 30 is also communicated via a communication path 59 to control module 62. Control module 62 is in turn connected via a communication path 61 to an image processing unit 64 which operates to compute a contour angle ($\Theta$) of the workpiece surface in relation to a z-axis. Control module 62 is further connected via a communication path 63 to light source 28 and acts to turn on light source 28 at the beginning of a precision movable mirror 20 scan (mirror angular rotation), turn off light source 28 at the end of a precision movable mirror 20 scan, and adjust system power during a precision movable mirror 20 scan.

With continuing reference to FIGS. 1-3, as previously noted, the scanning angle $\delta$ of the precision movable mirror 20 may be limited. In order to minimize a space envelope (volume and/or surface area) of a housing 65 containing sensor head 12, fold mirror 22 is positioned on a lens side of precision movable mirror 20 with collimated reduced diameter output beam 46 redirected by precision movable mirror 20 back toward fold mirror 22. Also, in order to satisfy the field of view of short standoff sensors, it is desirable to amplify the angular scanning capability of the precision movable mirror 20. To do so, as previously noted, light from precision movable mirror 20 reflected off fold mirror 22 is directed towards the diverger lens 24, which according to several embodiments can be a plano-concave lens. The amount of angular magnification provided by diverger lens 24 is a function of the radius of curvature of diverger lens 24 and the respective geometry between the light source 28, precision movable mirror 20 and fold mirror 22.

With continued reference to FIG. 3, during operation, the point of light projected by light source subsystem 60 which includes at least precision movable mirror 20, collimator lens 14 and beam reducer 19, plus light source 28 is controlled by an associated control module 62. Light from the light source subsystem 60 is preferably scanned at very high frequency during the exposure cycle of imaging device 30. The scanning speed of the light source subsystem 60 is considerably faster (e.g., approximately 100 times faster) than a shutter speed of the imaging device 30. By using a combination of scanning speed and shutter speed, imaging device 30 can obtain either line data, multi-line data or area illumination. The quality of area illumination is of similar quality as obtained through flood lighting sources, such as LEDs. The advantage of this illumination approach is that it uses the capability of a calibrated MEMS or movable mirror device that can execute reproducible precise paths. Thus, every position of precision movable mirror 20 in conjunction with the fixed position/orientation of fold mirror 22 during scanning is precisely known to and/or reported to the associated control module 62. In one exemplary embodiment, components of the sensor system 10 are integrated into the single housing 65. To reduce spacing between the components and a length of optical train 42, and thus the overall size of housing 65, the components are arranged as shown in FIG. 1 having the reduced diameter output beam 46 redirected by precision movable mirror 20 to fold mirror 22 in a direction back toward the beam reducer 19.

The actual position of each component with respect to the other components is tailored to match the best field coverage configuration throughout the depth of field (from near field to far field) of imaging device 30. It is readily understood that precise placement of components of the sensor system 10 (in the housing 65) is dependent upon the desired field coverage and image resolution.

The imaging device 30 is calibrated to an external reference frame. Imaging device 30 is assumed to be calibrated to report measurement data in a localized reference frame. Techniques for calibrating an imaging device in relation to an external reference frame are readily known in the art. Further details regarding a suitable calibration procedure that employs a laser tracker may be found, for example, in U.S. Pat. No. 6,134,507 which is incorporated by reference herein. Regardless of the calibration technique, this step yields a transform for the imaging device that maps measurements from its localized reference frame to the external reference frame. The external reference frame refers to a common coordinate system and may be associated with a workpiece being measured, the overall gauging station or some other reference frame.

Figure 4:
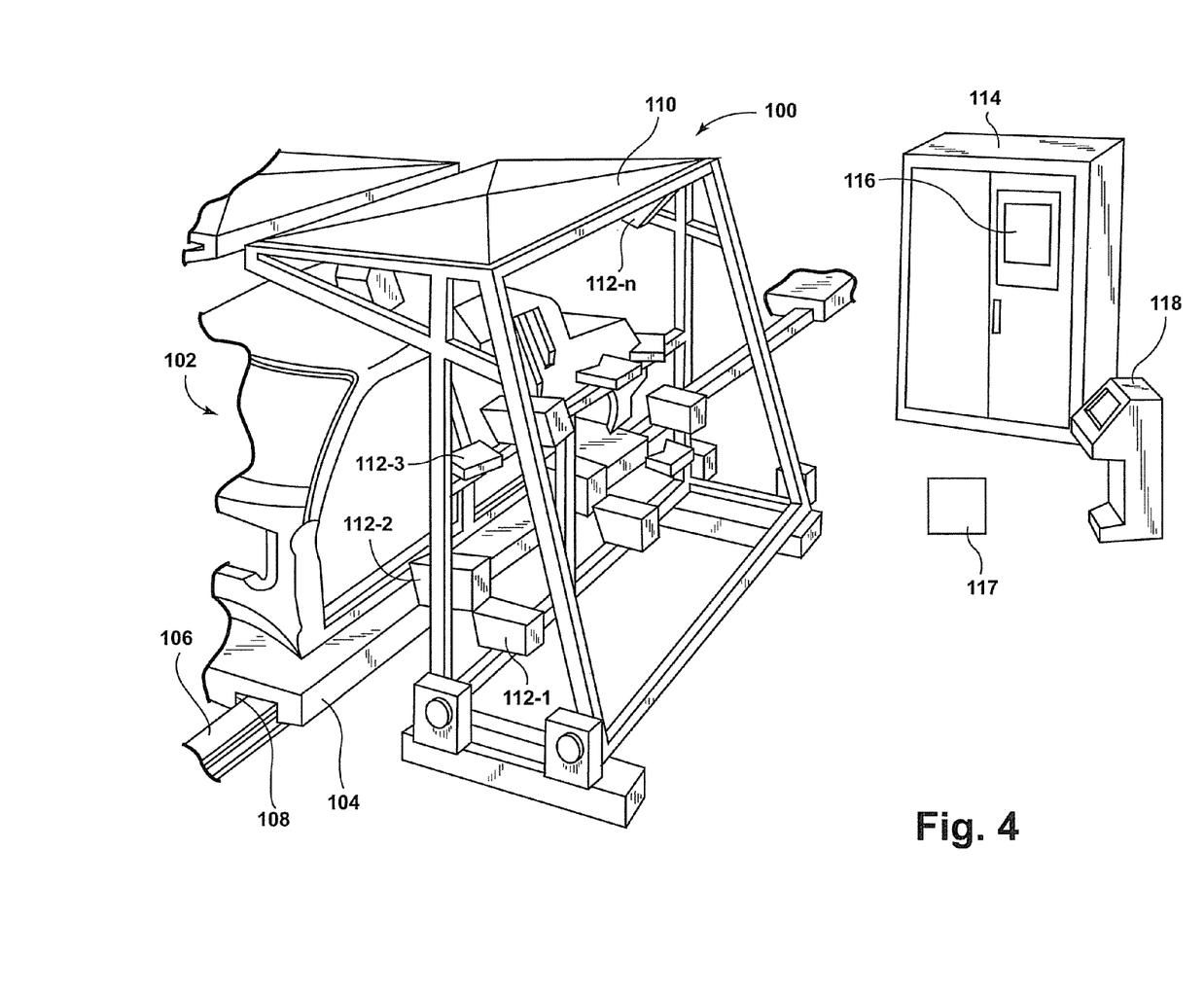
FIG. 4 is a front left perspective view of a multiple sensor system for exemplary use in an automobile vehicle gauging station.

Referring to FIG. 4, a typical gauging station 100 for acquiring measurement data for a work-piece such as an automotive vehicle part 102 could take the form shown. Work-pieces to be gauged at the gauging station 100 rest on transporting pallets 104, which are moved along an assembly line via pallet guides 106 that pass through guide channels 108 in the pallet 104. At the gauging station 100, a sensor mounting frame 110 (only one half of which is shown in FIG. 1) surrounds the work-piece such as automotive vehicle part 102 to be gauged and provides a plurality of mounting positions for a series of non-contact sensors 112-1 through 112-*n*.

Each of the non-contact sensors 112-1 through 112-*n* may be configured in the manner described above. In other words, each sensor is comprised of light source subsystem 60 and imaging device 30 arranged in the compact manner within the single housing 65 as described in relation to FIG. 1. Image data captured by each sensor may be translated to measurement data at the sensor or at a remote computer 114 which can have a visual readout panel 116 providing data such as signals indicating compliant or non-compliant conditions of the features or surfaces of automotive vehicle part 102. In either case, data is sent from the sensor to the remote computer 114 for further processing and/or storage. In some embodiments, two or more of the sensors may have overlapping fields of view and can therefore be calibrated to a common coordinate system 117. A data input device 118 for entering code required to calibrate the sensors or for entering system commands for operation of gauging station 100 can also be located in proximity to gauging station 100. If one of the sensors needs to be replaced or otherwise re-calibrated, the given sensor can be calibrated to the common coordinate system.

Figure 5:
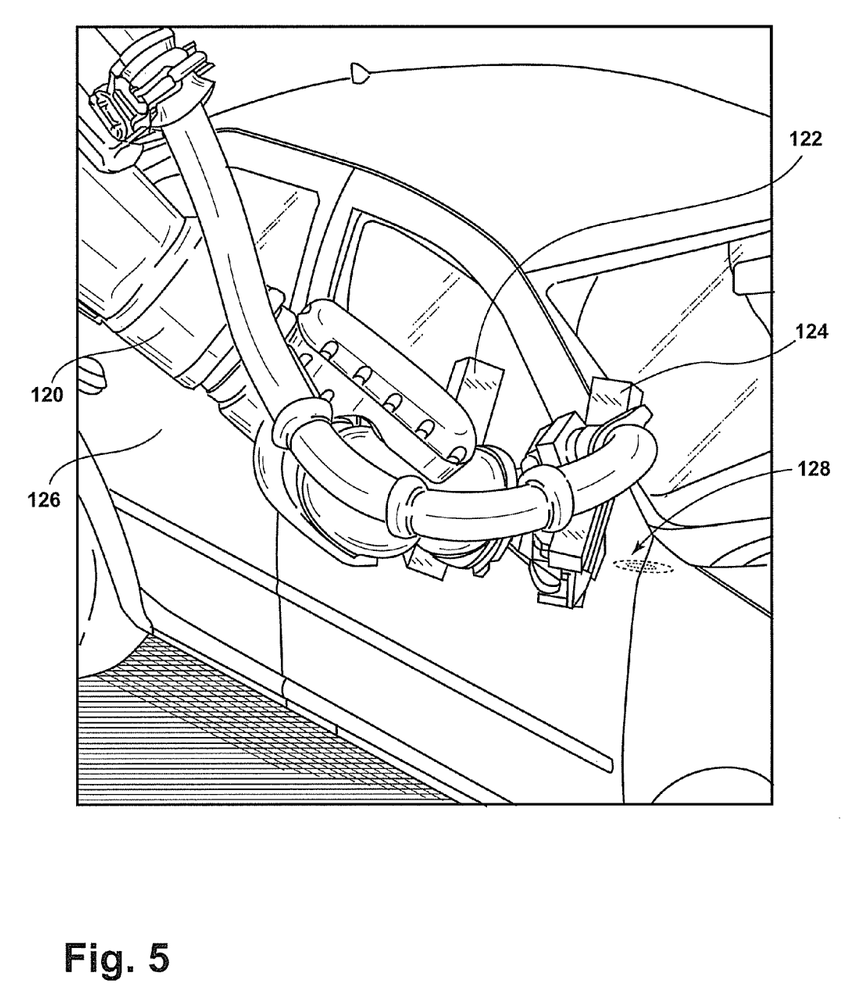
FIG. 5 is a front right perspective view of a vehicle and robotic system employing two non-contact sensors of the present disclosure.

Referring to FIG. 5 and again to FIG. 1, in lieu of having the work-piece move past fixed-location sensor heads of the present disclosure, a movable robot system can be used having for example a robot arm 120 which can displace first and second sensor heads 122, 124 (similar to sensor head 12) to a predetermined location about a work piece such as an automobile vehicle 126. In these embodiments the work piece can remain in a stationary position during scanning. First and second sensor heads 122, 124 are moved by robot arm 120 with respect to a surface or scanned area 128 (shown in this example as a vehicle door panel). Robot arm 120 can be further configured to permit reorientation of first and/or second sensor heads 122, 124 to suit different surface geometries of vehicle 126. Robot arm 120 can also provide a single or more than two sensor heads within the scope of the present disclosure.

Referring to FIG. 6 and again to FIGS. 1 and 2, in known systems, outgoing beams that are not collimated and focused using sensor heads 12 of the present disclosure have non-circular, oval or irregularly shaped beam faces or spots at the beam reflection location with an object. Because accurate location data requires establishing a center of the beam or beam spot at the object surface, this irregularity causes errors and/or inaccuracies in establishing the beam center and therefore causes errors and/or inaccuracies in the reflected/received signals. Through use of the collimating capability of collimating lens 14, the focusing/reducing properties achieved by use of adjustable beam reducer 19 of sensor heads 12 in controlling the beam waist 52 at precision movable mirror 20, and controlling the overall length of optical train 42 through the use of fold mirror 22, a Gaussian distribution 130 of the outgoing beam is created and maintained as the outgoing beams extend to the surface of object 32 for each of the outgoing beams 54, 56, 58 (only beam 56 is shown in this view).

Figure 6:
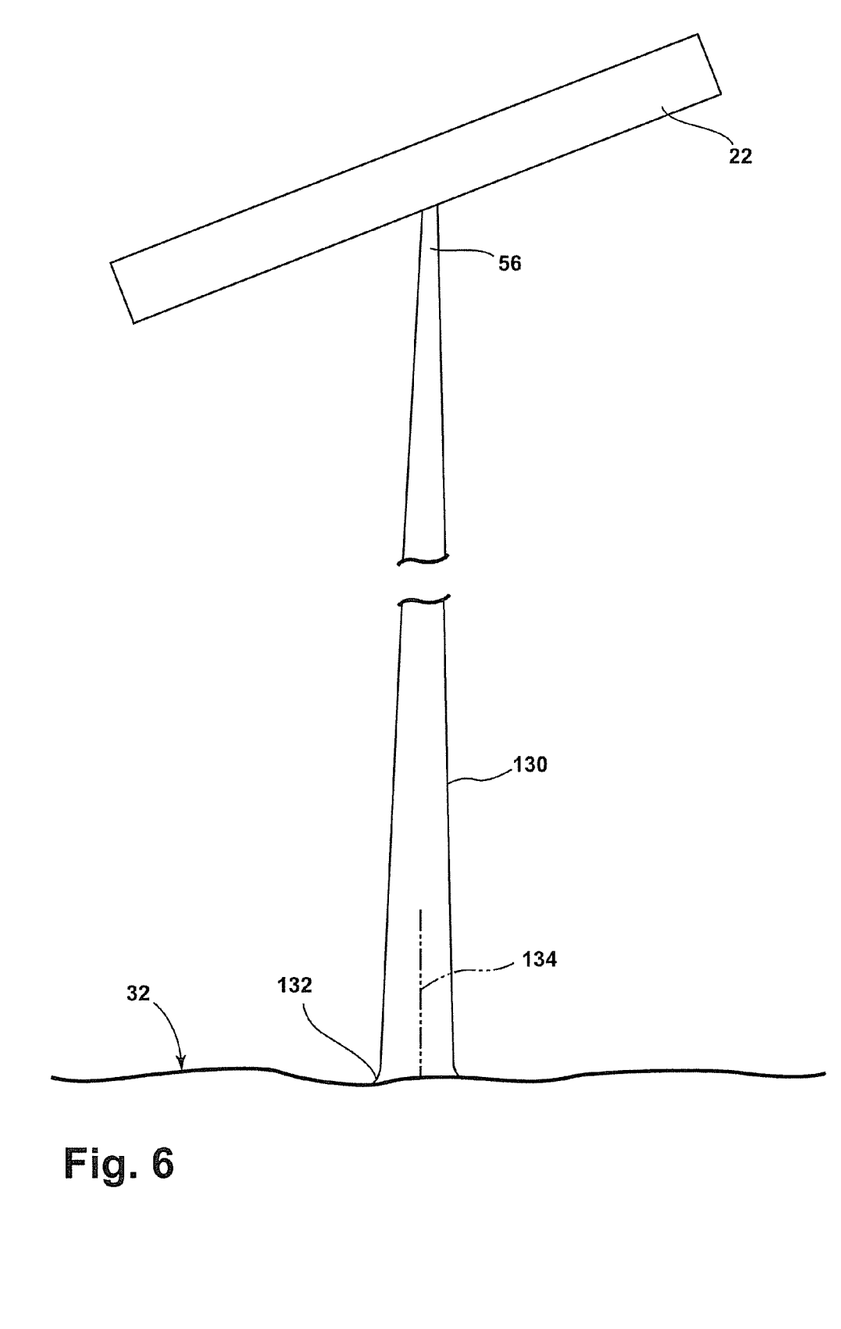
FIG. 6 is a front elevational view of a Gaussian distribution of the light beam emitted by the sensor at the object surface.

Gaussian distribution 130 is created by the output fiber 36 which receives an elliptical-shaped beam output from laser light source 28, scrambles the laser energy in output fiber 36, and outputs a circular Gaussian spot. The optical components of sensor head 12 thereafter control a size and position of the Gaussian distribution 130 throughout the scanning path and the measurement volume. Gaussian distribution 130 is maintained for each of the beams as precision movable mirror 20 is scanned over its operating frequency with or without the use of diverger lens 24. Gaussian distribution 130 of the outgoing beams created by sensor heads 12 of the present disclosure creates a substantially circular beam face 132 at object 32, thereby increasing the accuracy of identifying a center 134 of the beam face 132 and the accuracy of the subsequently reflected signals received at imaging device 30.

An exemplary operation of sensor system 10 is as follows. Diode 35 defining laser light source 28 operates to emit a laser beam. Output fiber 36 receives the laser beam and creates the Gaussian distributed optical beam 26. A lens package receives and focuses the optical beam 26. The lens package includes in sequence collimating lens 14 and first and second lenses 16, 18 that both define a beam reducer 19. Precision movable mirror 20 receives optical beam 26 from the lens package. Optical beam 26 is collimated by collimating lens 14 and has a diameter "A" reduced by the first and second lenses 16, 18 to correspond to the surface area "Z" of the precision movable mirror 20. The fixed fold mirror 22 receives the optical beam 26 reflected from the precision movable mirror 20. The precision movable mirror 20 and the fold mirror 22 are used to scan the optical beam 26 to the area of illumination or scanned area 34. The imaging device 30 has a field of view intersecting with the area of illumination or scanned area 34 and receives image data of the optical beam 26 reflected from the area of illumination. The control module 62 in data communication with the imaging device 30 receives a location of object 32 in the field of view of the imaging device 30 from the image data and reports the location data of the object 32 to a coordinate system.

As used herein, the term module can refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module can include memory (shared, dedicated, or group) that stores code executed by the processor. The term code can include software, firmware, and/or microcode, and can refer to programs, routines, functions, classes, and/or objects. The term shared, as used above, means that some or all code from multiple modules can be executed using a single (shared) processor. In addition, some or all code from multiple modules can be stored by a single (shared) memory. The term group, as used above, means that some or all code from a single module can be executed using a group of processors. In addition, some or all code from a single module can be stored using a group of memories.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A non-contact sensing system for acquiring three-dimensional information, comprising:
    a laser light source generating a laser beam;
    an optical fiber configured to receive the laser beam and operable to output an optical beam having a circular shape and energy with a Gaussian distribution;
    a movable mirror receiving the optical beam, the movable mirror angularly adjusted to scan the optical beam in an area of illumination and further defined as a micro electro-mechanical system;
    a lens package positioned between the laser light source and the movable mirror receiving the optical beam from the fiber and sizing the optical beam to under-fill an optical surface of the movable mirror;
    an imaging device receiving image data of the area of illumination from the optical beam returned from the area of illumination; and
    a control module in data communication with the imaging device, operating to determine location data of an object from the image data and report the location data in a coordinate system.

2. The non-contact sensing system for acquiring three-dimensional information of claim 1, wherein the lens package includes in sequence:
    a collimating lens operating to convert the optical beam to a collimated optical beam; and
    a beam reducer receiving the collimated optical beam from the collimating lens and operating to reduce a diameter of the collimated optical beam to under-fill the optical surface of the movable mirror.

3. The non-contact sensing system for acquiring three-dimensional information of claim 2, wherein the beam reducer includes:
    a first lens receiving the collimated optical beam from the collimating lens; and
    a second lens receiving the collimated optical beam from the first lens.

4. The non-contact sensing system for acquiring three-dimensional information of claim 3, wherein a spacing between the first and second lenses is adjustable to change the diameter of the collimated optical beam.

5. The non-contact sensing system for acquiring three-dimensional information of claim 3, wherein at least one of the first and second lenses defines an achromatic doublet.

6. The non-contact sensing system for acquiring three-dimensional information of claim 2, wherein the laser light source is coupled to a fiber having an output positioned at a focus of the collimating lens.

7. The non-contact sensing system for acquiring three-dimensional information of claim 1, further including a movement device operating to change an angle of a face of the movable mirror measured with respect to an incoming orientation path of the optical beam.

8. The non-contact sensing system for acquiring three-dimensional information of claim 7, wherein the movement device is operated to change the angle of the movable mirror face within a range from approximately 1 to approximately 6 degrees.

9. The non-contact sensing system for acquiring three-dimensional information of claim 8, further including a fold mirror oriented to redirect the optical beam received from the movable mirror orthogonally with respect to the orientation path of the optical beam received at the movable mirror and maintain a round shape of the optical beam.

10. The non-contact sensing system for acquiring three-dimensional information of claim 1, further including a diverger lens receiving the optical beam from the movable mirror and increasing a scan angle of the optical beam, a position of the diverger lens adjustable to change the area of illumination to achieve a desired scanned measurement volume.

11. The non-contact sensing system for acquiring three-dimensional information of claim 10, wherein a focal length of the diverger lens is selected to increase or decrease the area of illumination to change a scanned measurement volume.

12. The non-contact sensing system for acquiring three-dimensional information of claim 1, wherein the lens package includes at least one lens defining an achromatic doublet.

13. The non-contact sensing system for acquiring three-dimensional information of claim 1, wherein the imaging device comprises a CCD camera.

14. A non-contact sensing system for acquiring three-dimensional information, comprising:
a laser light source generating an elliptical-shaped laser beam;
an output fiber configured to receive the laser beam and operable to output an optical beam having a circular shape and energy with a Gaussian distribution;
a movable mirror receiving the optical beam and angularly adjusted to scan the optical beam in an area of illumination;
a lens package positioned between the laser light source and the movable mirror receiving the optical beam from the output fiber and focusing the optical beam to underfill an optical surface of the movable mirror;
a fixed fold mirror receiving the optical beam from the movable mirror, the fold mirror and the movable mirror together redirecting the optical beam orthogonally with respect to an orientation of the optical beam generated by the laser light source;
an imaging device having a field of view intersecting with the area of illumination thereby receiving image data of the optical beam reflected from the area of illumination; and
a control module in data communication with the imaging device, operating to determine a location of an object in the field of view of the imaging device from the image data and report location data of the object to a coordinate system.

15. The non-contact sensing system for acquiring three-dimensional information of claim 14, wherein the movable mirror is angularly adjusted to an angle α of 20 degrees maximum with respect to the optical beam.

16. The non-contact sensing system for acquiring three-dimensional information of claim 15, wherein an angular orientation β of the fold mirror is determined by the function β=45°−α.

17. The non-contact sensing system for acquiring three-dimensional information of claim 15, wherein angle α has an angular range from approximately 5 degrees to the maximum of 20 degrees with respect to the optical beam.

18. The non-contact sensing system for acquiring three-dimensional information of claim 14, wherein an optical train includes the laser light source, the lens package, the movable mirror and the fold mirror, the optical train having a length minimized by reorienting the optical beam orthogonally with respect to an orientation of the optical beam.

19. The non-contact sensing system for acquiring three-dimensional information of claim 18, wherein the optical train length is approximately 62 mm.

20. The non-contact sensing system for acquiring three-dimensional information of claim 18, wherein the fold mirror is positioned between the movable mirror and the lens package and offset with respect to the optical beam.

21. The non-contact sensing system for acquiring three-dimensional information of claim 14, wherein a waist diameter of the optical beam reduced by the lens package is ≦0.5 mm at the movable mirror.

22. A non-contact sensing system for acquiring three-dimensional information, comprising:
a diode defining a laser light source operating to emit a laser beam;
an optical fiber configured to receive the laser beam at one end and operates to output an optical beam at the opposing end of the fiber, the optical beam having a circular shape and energy with a Gaussian distribution;
a collimating lens configured to receive the optical beam from the optical fiber and collimate rays of the optical beam;
at least one reducer lens configured to receive the collimated optical beam from the collimating lens and operates to reduce diameter of the collimated optical beam to a value less than the diameter of the optical beam output by the optical fiber, the reducer lens includes achromatic doublet;
a movable mirror configured to the optical beam from the at least one reducer lens and operable to angularly scan the optical beam in an area of illumination, wherein the movable mirror is further defined as a micro electro-mechanical system that operates to change the angle of the movable mirror within a range from approximately 1 to approximately 6 degrees;
a fold mirror configured to receive the optical beam from the movable beam and orientated to direct the optical beam orthogonally with respect to path the optical beam is incident upon the movable mirror;
an imaging device having a field of view intersecting with the area of illumination thereby receiving image data of the optical beam reflected from the area of illumination; and
a control module in data communication with the imaging device operating to receive a location of an object in the field of view of the imaging device from the image data and report location data of the object to a coordinate system.

23. The non-contact sensing system for acquiring three-dimensional information of claim 22, further including an imaging processing system in communication with the control module operating to convert the image data to a coordinate system.

24. The non-contact sensing system for acquiring three-dimensional information of claim 22, wherein the movable mirror and the fold mirror are together angularly adjusted to orthogonally orient the optical beam with respect to an orientation of the optical beam emitted by the fiber coupled laser.

25. The non-contact sensing system of claim 22 wherein the diode is coupled to the optical fiber such that an output of the optical fiber is positioned at a focus of the collimating lens.

26. The non-contact sensing system of claim 22 further including a diverger lens receiving the optical beam from the movable mirror and increasing a scan angle of the optical beam, a position of the diverger lens adjustable to change the area of illumination to achieve a desired scanned measurement volume.

27. The non-contact sensing system of claim 26 wherein a focal length of the diverger lens is selected to increase or decrease the area of illumination to change a scanned measurement volume.

28. The non-contact sensing system of claim 22 wherein the imaging device comprises a CCD camera.

* * * * *